United States Patent [19]

MacMinn et al.

[11] Patent Number: 4,739,240

[45] Date of Patent: Apr. 19, 1988

[54] COMMUTATOR FOR SWITCHED RELUCTANCE DRIVE

[75] Inventors: Stephen R. MacMinn, Schenectady; Paul M. Szczesny, Burnt Hills, both of N.Y.

[73] Assignee: General Electric Company, Schenectady, N.Y.

[21] Appl. No.: 44,075

[22] Filed: Apr. 29, 1987

[51] Int. Cl.$^4$ ............................................. H02P 8/00
[52] U.S. Cl. .................................... 318/696; 318/685; 318/811
[58] Field of Search ......................... 318/696, 685, 811

[56] References Cited

U.S. PATENT DOCUMENTS

| | | | |
|---|---|---|---|
| 4,270,074 | 5/1982 | Duckworth et al. | 318/254 |
| 4,368,411 | 1/1983 | Kidd | 318/254 |
| 4,489,267 | 12/1984 | Saar et al. | 318/811 |
| 4,602,882 | 7/1986 | Akazawa | 400/322 |

OTHER PUBLICATIONS

Chappell et al., "Microprocessor Control of a Variable Reluctance Motor", IEEE Proc. B., vol. 131, Pt B, No. 2, Mar. 1984, pp. 51–60.
"Universal Brushless Motor Commutator", L. Thompson et al., 13th Annular Symposium on Incremental Motion Control Systems and Devices, Urbana, Ill., May 1984, pp. 41–47.
"Microcomputer Control of Switched Reluctance Motor", by B. K. Boxe et al., Conference Record of Oct. 1985, IEEE Industry Application Society Annual Meeting, pp. 1–6.

Primary Examiner—William M. Shoop, Jr.
Assistant Examiner—M. Bergmann
Attorney, Agent, or Firm—Marvin Snyder; James C. Davis, Jr.

[57] ABSTRACT

A commutator for a microcomputer based switched reluctance drive employs a selectively addressable non-volatile memory, e.g. a ROM, to store stator phase firing patterns and facilities selective adjustment of turn-on angle and pulsewidth of phase switching current pulses. Firing patterns differing only in pulsewidth of their respective pulses can be stored in different sections of the memory or in the same section where word bit width permits. The adjustment of pulse position and duration allows torque control of the motor over a very wide speed range.

19 Claims, 5 Drawing Sheets

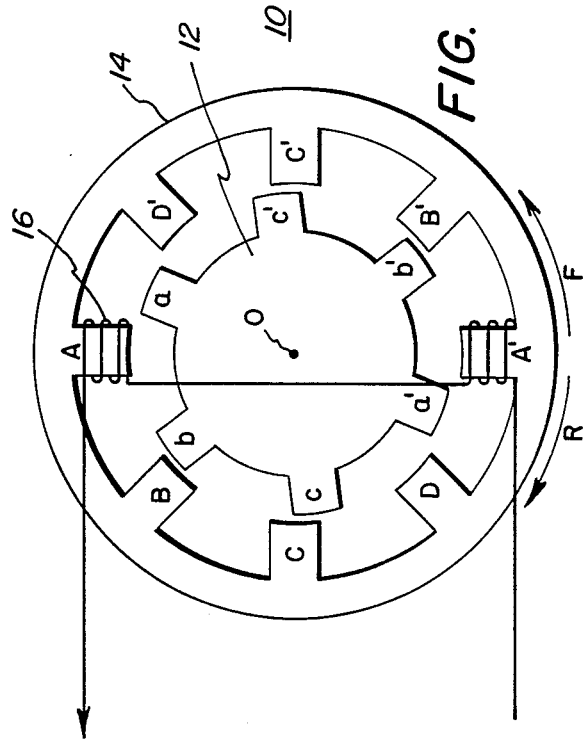
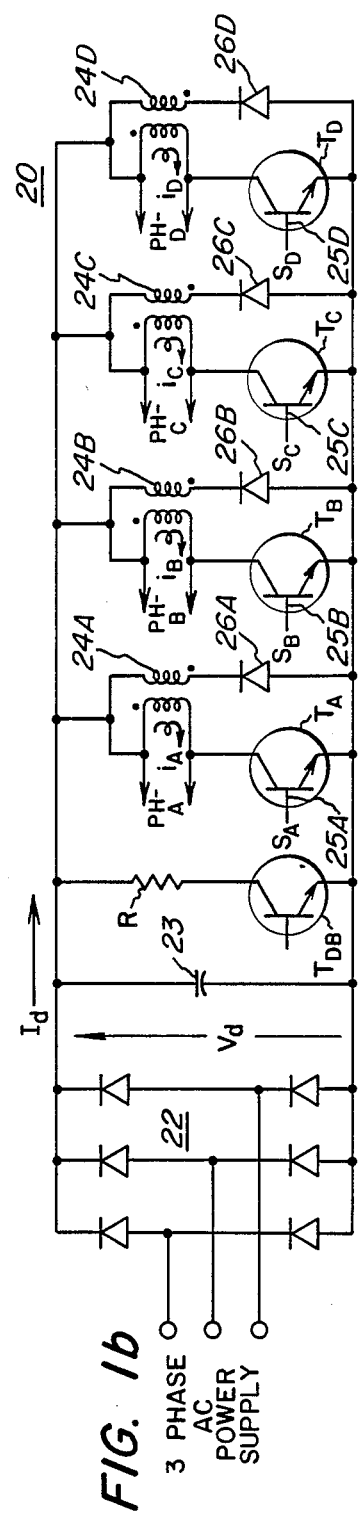
FIG. 1a
FIG. 1b

COMMUTATOR FOR SWITCHED RELUCTANCE DRIVE

BACKGROUND OF THE INVENTION

This invention relates in general to switched reluctance drives and more particularly to a commutator for controlling the firing of phases of a switched reluctance motor over a very wide speed range.

Although they have been known for some time, interest in switched reluctance motor (SRM) drives has recently revived. Compared to conventional induction and synchronous motor drive systems, the SRM drive is simple in construction and economical. In addition, the converter which supplies power to the SRM machine requires fewer power devices and therefore is more economical and reliable. In view of these advantages, the switched reluctance motor drive system provides an attractive alternative to conventional drive systems and is expected to find wide applicability in industrial applications.

Switched reluctance motors conventionally have multiple poles or teeth on both the stator and rotor (i.e., double salient). There are phase windings on the stator but no windings or magnets on the rotor. Each pair of diametrically opposite stator poles is connected in series to form an independent phase of the multiphase switched reluctance motor.

Torque is produced by switching current on in each phase winding in a predetermined sequence that is synchronized with the angular position of the rotor, so that a magnetic force of attraction results between the rotor and stator poles that are approaching each other. The current is switched off in each phase before the rotor poles nearest the stator poles of that phase rotate past the aligned position; otherwise, the magnetic force of attraction would produce a negative or braking torque. The torque developed is independent of the direction of current flow so that unidirectional current pulses synchronized with rotor movement can be applied to the stator phase windings by a converter using unidirectional current switching elements such as thyristors and transistors.

The switched reluctance drive thus operates by switching the stator phase currents on and off in synchronism with rotor position. By properly positioning the firing pulses relative to rotor angle, forward or reverse operation and motoring or generating operation can be obtained.

In many cases, use of a fixed set of current pulse firing angles in conjunction with current level regulation suffices to control torque for the entire range of motor operation. In such cases, a set of optical interrupters and a slotted disk can be used to perform commutation.

Recently, however, the switched reluctance motor has been finding increasing application as a combination motor/generator, or as a position servo. For these applications, fixed firing angles do not always provide sufficient machine torque performance over the required speed range. Also for these applications, precise position and speed information is often required over the full operating range of the machine. In such applications, a slotted disk may not provide sufficient accuracy and an optical encoder or resolver is often used for position and speed sensing.

In general, as the speed range of a switched reluctance motor increases, it becomes desirable to be able to selectively adjust the firing angles of the current pulses with respect to rotor position. At high speeds, current control is lost and the only way to control the motor torque is by varing pulse position and width.

If an SRM analog controller is used in such applications, commutator circuitry in hardware form is needed to generate the appropriate phase firing pulses. When, as is often desirable, a microprocessor-based controller is employed, the processor itself can generate the firing commands at lower speeds, but as the machine's speed increases, this task takes an unacceptable portion of the processor's time. Accordingly, it is desirable to shift the commutation function from the microprocessor to a separate digital circuit.

A number of digital commutator circuits have previously been proposed for brushless DC motors. Most of these appear to be limited in either their interface to the rotor position sensor or their speed range. By way of example, L. Thompson and M. Lee in a paper intitled, "Universal Brushless Motor Commutator" presented at the 13th Annual Symposium on Incremental Motion Control Systems and Devices, Urbana, Ill. May, 1984, describe a commutation circuit that interfaces to an incremental encoder and allows firing advance, but uses a fixed pulsewidth. However, in a switched reluctance motor, current regulation is unavailable at high speed because of back EMF build-up, and pulsewidth widening is needed to allow operation at such high speeds.

U.S. Pat. Nos. 4,270,074 and 4,368,411 describe control systems for brushless DC motors employing a read-only memory (ROM). By brushless DC motors, these patents, as is conventional, refer to permanent magnets are glued to the surface of the rotor and the stator phase windings are connected together in a WYE configuration, rather than to switched reluctance motors. U.S. Pat. No. 4,270,074 employs a ROM addressed by motor shaft position sensors to ensure synchronous operation, but makes no provision for changing the response of the memory as a function of speed. U.S. Pat. No. 4,368,411 uses a ROM to control a drive switching circuit. An external pulsewidth modulator allows some variation in pulsewidth of the pulses produced by the ROM but this patented circuit does not provide variation in the turn-on angle of these pulses.

Accordingly, need exists for a commutator to control the switching of stator phases of a switched reluctance motor in a digital control scheme, relieving the microprocessor of that task. This would also allow great flexibility in both the placement and duration of phase firing pulses, thereby making SRM performance possible over a wider speed range including extremely high speeds.

SUMMARY OF THE INVENTION

The aforementioned need is satisfied and the shortcomings of the prior art overcome, in accordance with the present invention, by the provision of a commutator for a switched reluctance drive which employs a selectively addressable nonvolatile memory, e.g. a ROM. The memory preferably stores a plurality of standard multiphase firing patterns. Each pattern contains a sequence of stator phase firing pulses over an electrical cycle of the drive. Each pulse of a particular pattern is preferably of equal duration and has a turn-on angle corresponding to a different initial rotor position. The patterns preferably differ only in pulsewidth. The memory is addressed in synchronism with instantaneous rotor position to produce a sequence of phase switching command pulses with a desired adjustable advance angle and pulsewidth.

In a preferred embodiment of the invention, the memory stores each pattern of pulses as words at addressable locations therein. Each word represents the switched state of all phases of the motor at a particular rotor position and each addressable location represents a different rotor position for the electrical cycle of the motor. A digital summer sums a first digital representation of instantaneous rotor position and a second digital representation of a desired advance angle to provide a composite address signal for reading out information from the memory. A microprocessor specifies the advance angle and also provides a dwell signal for identifying which pattern stored in the memory is to be addressed at a given time. The various firing patterns can be stored in different sections of the memory and/or multiple patterns can be stored in the same section of a memory where word size permits. In the latter case, dwell signal responsive multiplexers are preferably employed to distinguish between different patterns.

In addition to the particular construction of the commutator, the invention contemplates a microprocessor-based switched reluctance drive incorporating such commutator, and commutation methods advantageously implemented thereby.

Accordingly, a principal object of the invention is to provide, for SRM machines with an arbitrary number of phases, a commutator, based in digital hardware, that relieves a microprocessor of the commutation function and performs this function over an extremely wide speed range.

Another object is to provide an SRM commutator which allows complete flexibility in both the placement and duration of stator phase firing pulses.

A further object is to provide a commutator for a switched reluctance drive which easily interfaces to either a standard resolver-to-digital converter or an optical encoder.

A further object of the invention is to provide a commutator for a switched reluctance motor which is simple and inexpensive and yet facilitates good torque control of the motor at higher speeds than previously practical.

Yet another object is to provide a commutator and control system which facilitates selective turn-on and duration of stator phase firing pulses with respect to rotor angular position in a switched reluctance motor.

A still further object is to provide a commutator and control system which allows use of an SRM, over a very wide speed range, as a combination motor/generator, or as a position servo, or in other diverse applications.

BRIEF DESCRIPTION OF THE DRAWINGS

The foregoing and other objects, features and advantages of the present invention will be apparent from the following detailed description of the invention when read in conjunction with the accompanying drawings in which:

FIG. 1a is a simplified cross-sectional view of a typical switched reluctance motor;

FIG 1b illustrates a typical power converter for the switched reluctance motor of FIG. 1a;

FIG. 4 graphically depicts variations in a phase switching command pulse for a single stator phase in the switched reluctance motor of FIG. 1a;

DETAILED DESCRIPTION OF THE INVENTION

Figure 2:
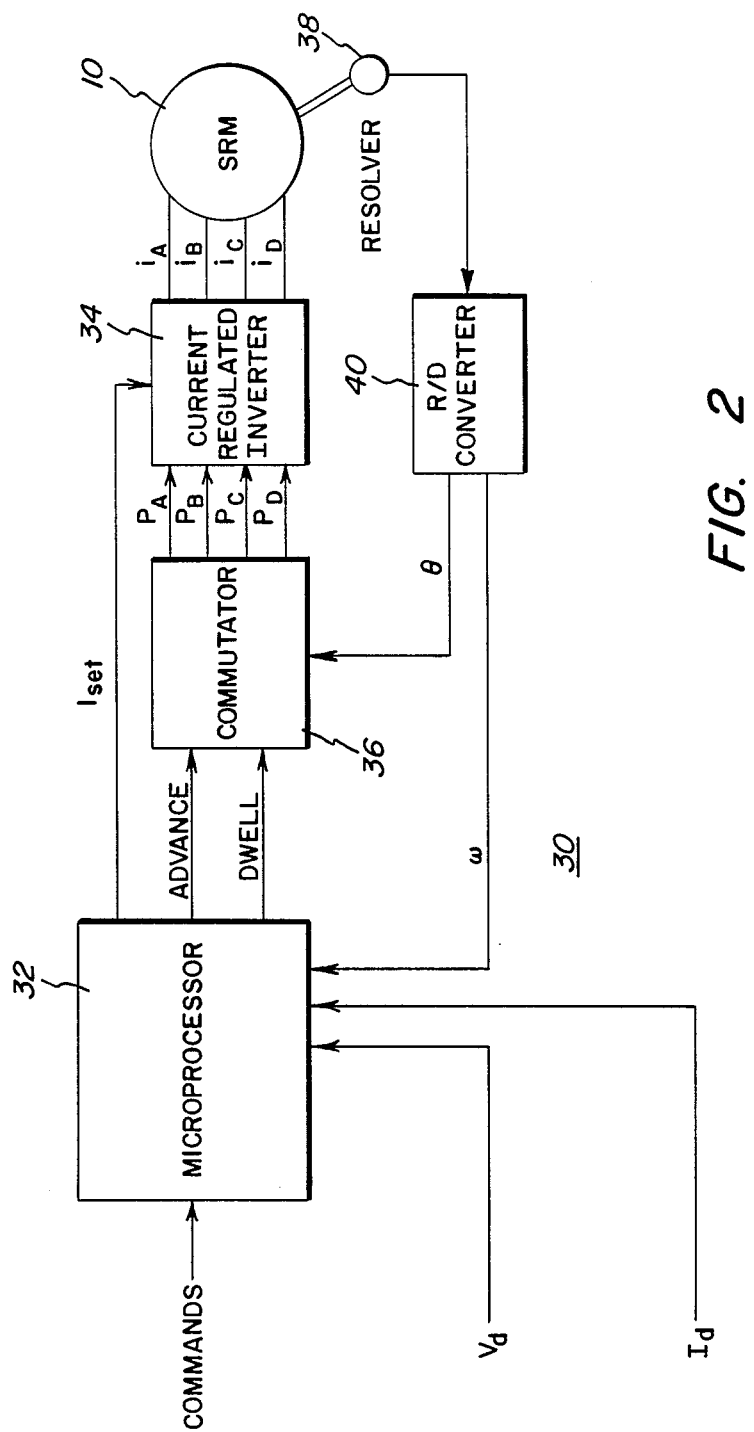
FIG. 2 depicts in block diagram form the overall switched reluctance drive of the present invention.

The commutator and control system of the present invention are specifically designed for use with an SRM in a switched reluctance drive. By way of example, a four-phase switched reluctance motor 10 is illustrated in FIG. 1a, and a typical associated power converter 20 is shown in FIG. 1b. It should be understood that this motor-converter configuration is merely representative, and that the commutator and control system of the present invention are applicable to any SRM having any number of phases.

As shown in FIG. 1a, motor 10 includes a rotor 12 rotatable in either a forward or reverse direction within a stationary stator 14. As illustrated, the forward direction F indicates counterclockwise rotation of the rotor while the reverse direction R indicates clockwise rotation. Rotor 12 has three pairs of diametrically opposite poles a-a', b-b', and c-c'. Stator 14 is provided with four pairs of diametrically opposite stator poles A-A', B-B', C-C' and D-D'.

The opposite poles of each stator pole pair share a common bifilar winding and define a respective independent stator phase. A representative winding coil 16 for phase A is illustrated in FIG. 1a, and similar windings (not shown) are provided for each of the other stator pole pairs.

Rotor rotation is produced by switching current on and off in each stator phase winding in a predetermined sequence synchronized with angular position of the rotor. Current in each stator phase is derived from power converter 20, such as that shown in FIG. 1b, which impresses a DC link voltage $V_d$ across the four parallel stator phase legs PH-A, PH-B, PH-C and PH-D. Link voltage $V_d$ can be obtained from a battery (not shown), or from an AC power supply (e.g. a three-phase, 220 V, 60 Hz line) through a conventional diode rectifier circuit 22 and filtering capacitor 23.

The converter circuitry for each stator phase leg is identical. The PH-A leg, for example, includes stator bifilar winding 24A, a feedback diode 26A and a current switching device, e.g. transistor $T_A$, interconnected as shown in FIG. 1b. Base 25A of transistor $T_A$ is connected to an output of the control system of the present invention and receives a switching control pulsetrain $S_A$ therefrom.

When transistor $T_A$ is switched on, a phase current $i_A$, derived from link current $I_d$, flows through the stator winding for phase A. When transistor $T_A$ is switched off, bifilar winding 24A in series with feedback diode 26A returns stored energy to the source. During braking, dynamic brake transistor $T_{DB}$ in series with a resistor R across the rectified AC source is switched on to dissipate recovered energy in resistor R. Alternatively, with a battery power supply, the energy is absorbed by the power supply.

The converter circuitry for each of the other phase legs operates identically and accordingly is not detailed herein. Transistors $T_A$, $T_B$, $T_C$ and $T_D$ are made to conduct in sequence, with the order of conduction depending upon the direction of rotation. In the illustrated four-phase machine, a particular phase is fired periodically with a 60° cycle period and, therefore, for the four-phase machine, consecutive phases are fired at 15° intervals.

The present invention is concerned with a commutator for controlling the positioning and duration of the phase switching command pulses provided to the current switching devices of the inverter. A block diagram of a microcomputer-based SRM control system 30, incorporating such a commutator, is illustrated in FIG. 2. As shown, a microprocessor 32 receives link voltage $V_d$, link current $I_d$, a speed feedback signal $\omega$ and operator commands. In known fashion, the microprocessor processes these inputs and provides a set current command $I_{set}$, an ADVANCE angle command and a DWELL command designed to produce the desired SRM performance. The set current command $I_{set}$ is provided to a current-regulated inverter 34, similar to previously described inverter 20 of FIG. 1b, but which also, in known fashion, regulates the current level of the stator phase current pulses.

The ADVANCE and DWELL commands from microprocessor 32 are provided to a commutator 36, described more fully hereinafter, along with a position signal $\theta$ representative of instantaneous rotor position. Specific optimum angles for firing the stator phases (i.e. the advance angle and dwell or pulsewidth) over a desired speed range depend on the machine geometry and can, for example, be determined experimentally and then implemented in the microprocessor, in known fashion, e.g. by approximating them with polynomials or piecewise linear approximations, or with look-up tables. The particular method of function implementation is not critical in the present invention, so long as the ADVANCE and DWELL commands from output ports of the microprocessor provide the desired motor control over the speed range for the particular applications.

A resolver 38 in conjunction with a resolver-to-digital converter 40, or any equivalent rotor position sensing and interfacing apparatus, generates the digital position signal $\theta$, representative of instantaneous rotor angular position. Converter 40 also supplies the feedback speed signal $\omega$ to microprocessor 32.

Commutator 36 processes the ADVANCE and DWELL commands, along with the rotor position signal $\theta$, to produce phase switching command pulses $P_A$, $P_B$, $P_C$ and $P_D$, for the respective stator phases. As more fully described hereinafter, the turn-on and turn-off angles of the phase switching command pulses (i.e. the stator phase firing pattern) are selectively controlled by the microprocessor to optimize torque over a wide speed range. The phase switching command pulses are processed, along with the set current command $I_{set}$, by current regulated inverter 34 to provide the desired stator phase current pulses $i_a$, $i_b$, $i_c$ and $i_d$ to SRM 10.

In operation, torque produced by the switched reluctance motor 10 is controlled by controlling the amount of current fed to the motor and the angles at which the current is switched on and off. At low speed, the set current level $I_{set}$ is varied to achieve the desired torque, and turn-on angle and pulsewidth are maintained constant. As speed increases, the turn-on angles are adjusted to maximize motor efficiency through the advance angle adjustment. At higher speeds, current control is lost and the torque is regulated by adjusting turn-on and turn-off angles of the phase switching command pulses in response to the advance and dwell commands received from the microprocessor.

To change the direction of the torque produced by the motor, the advance angle is programmmed to position the firing pulse on the opposite side of the stator pole-rotor pole aligned position. This allows reverse operation or allows the motor to be used as a generator.

The commutator of the present invention in effect unloads the described commutation function from the microprocessor and facilitates "real time" adjustment of the placement and pulsewidth of the stator phase firing pattern as a function of rotor position.

Figure 3:
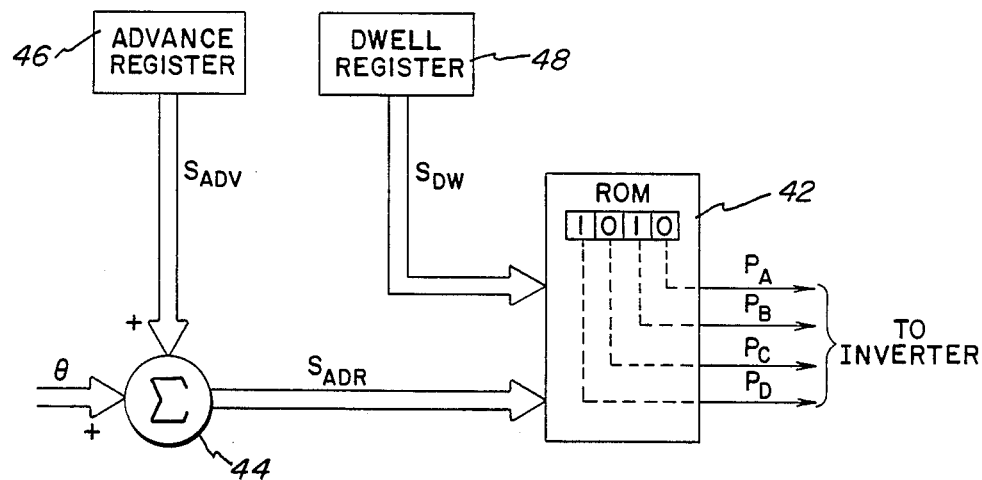
FIG. 3 depicts in block diagram form a first embodiment of the commutator of the present invention.

FIG. 3 depicts a first embodiment of the commutator of the present invention. The commutator employs a nonvolatile memory, preferably a Read Only Memory (ROM) 42. Memory 42 serves to store a plurality of standard stator phase firing patterns. Each pattern contains a sequence of stator phase firing pulses over an electrical cycle of the drive and each pulse of a particular pattern is preferably of equal duration and has a turn-on angle corresponding to a different initial rotor position. The different patterns preferably differ only in the pulsewidth of their respective pulses.

Preferably, the memory stores each pattern of pulses as words at addressable locations therein. Each word represents the switched state of all phases of the motor at a particular rotor position and each addressable location represents a different rotor position for the electrical cycle of the motor. Thus each unique ROM address corresponds to a rotor angle and each word of the ROM contains a pattern of bits (ones and zeros) that correspond to the stator switch states for that rotor angle. The values of a particular bit in the words therefore describe the firing pulse for a particular stator phase as the ROM address is varied over its full range. This is illustrated by pulse 50 in FIG. 4 which shows the value of a particular bit location of an N word ROM, at each address (i.e. rotor angle).

The ROM illustrated in FIG. 3 is four bits wide and therefore any switched reluctance motor having up to four phases can be accommodated using this ROM. Extending the system to motors of more than four phases merely requires a larger capacity ROM.

Desired rotor angular position resolution and the electrical cycle of the particular motor determine the number of addressable locations needed to store a single standard firing pattern. As an example, for a 3-phase system using a 10-bit resolver (i.e. 0.35156° resolution), only one quadrant (90°) of firing data need be stored. The resolution (10 bits) and electrical cycle (90°) together fix the size of the memory needed to store the pattern. In this case, since 90° is one-quarter of a revolution or eight bits, a 256 word ROM is required to store the pattern.

To allow arbitrary placement of the stator phase firing pulses, the commutator includes a digital summer 44, of any known design, which adds the digital position signal with a second digital signal $S_{ADV}$ representative of desired advance angle, to produce a composite address signal $S_{ADR}$ for reading information out of ROM 42 in synchronism with instantaneous rotor position. The advance angle, in effect, shifts the sensed machine rotor angle by any desired amount, and thus shifts the location of the pulses in the standard firing pattern produced by the ROM from their initial position by the same amount. A positive advance angle will cause firing to occur at an earlier angle and a negative angle will delay firing. The digital advance angle signal $S_{ADV}$ is preferably provided from an advance register or latch 46 which receives the ADVANCE command from an output port of microprocessor 32.

Varying the pulsewidth of the firing pattern is accomplished by storing firing patterns varying only in pulsewidth in different ROM sections. For example, in the 3-phase system discussed earlier, a 1k ROM could be used to store four different firing patterns. The "DWELL" input to the commutator from microprocessor 32 (shown in FIG. 2) can be fed to a dwell register or latch 48 (shown in FIG. 3). A digital signal $S_{DW}$ from dwell register 48 can then be used to select the firing pattern within the ROM to be addressed at any given time depending upon desired pulsewidth. The size of the ROM is then determined by the spacing and range of desired pulsewidths.

Figure 4:
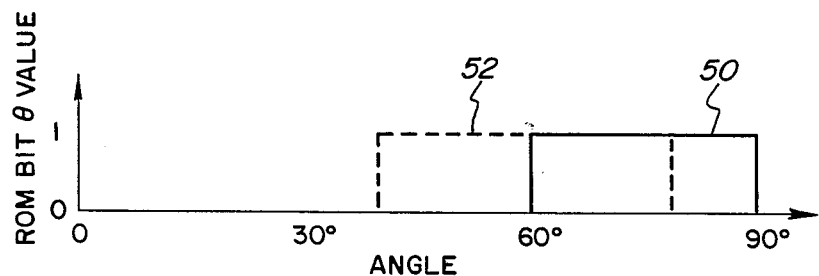

FIG. 4 graphically illustrates a standard phase switching command pulse 50 for a single stator phase having, for example, a turn-on angle of 60° and a pulse width of 30° and illustrates, in dashed lines 52, how the command pulse turn-on angle might be advanced and its pulsewidth extended, at higher speeds, by the commutator of the present invention.

Figure 5A:
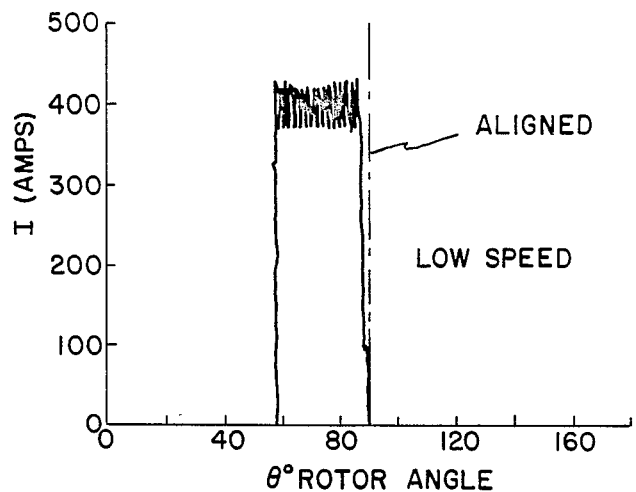
FIG. 5a graphically depicts a stator phase current pulse in the switched reluctance motor of FIG. 1a when operated at low speed.
Figure 5B:
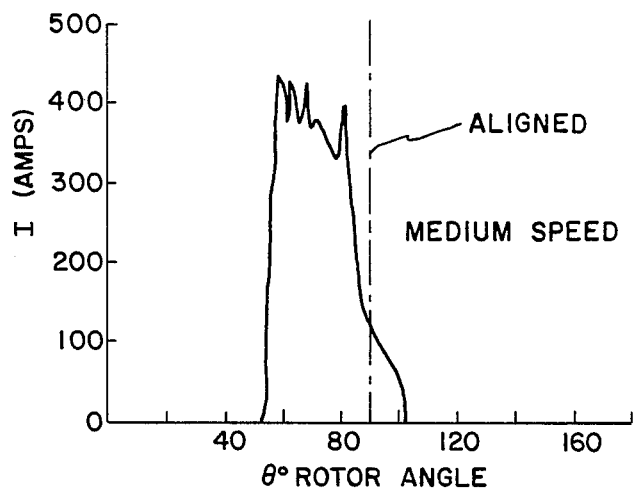
FIG. 5b graphically depicts a stator phase current pulse in the switched reluctance motor of FIG. 1a when operated at medium speed, the pulse being provided with an advance angle in accordance with the present invention.
Figure 5C:
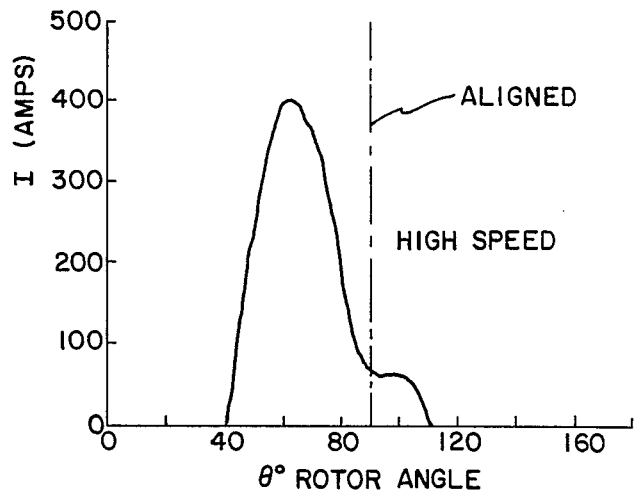
FIG. 5c graphically depicts a stator phase current pulse in the switched reluctance motor of FIG. 1a when operated at high speed, the pulse having an advance angle and extended pulsewidth in accordance with the present invention.

FIGS. 5a, 5b and 5c illustrate the waveform of a single stator phase current pulse at low, medium and high speeds, respectively, for constant motoring torque. In each of these figures, the vertical line labeled "Aligned" at 90° rotor angle represents the position where a rotor pole is aligned with a stator pole of the particular stator phase, the set current level is at 400 amps, and a nominal pulsewidth of the standard pulse is 30°.

As shown in FIG. 5a, at low speed, e.g. 1000 RPM, the current pulse is practically a square wave. When the phase is turned on, the current rises instantaneously with respect to rotor position to the set current level and is regulated about this current set point over the duration of the pulse. When the phase is switched off the current falls practically instantaneously to zero. At such low speeds, torque control is provided by current regulation and there is no need to change the pulsewidth or advance the turn-on position.

As the speed increases, as shown in the graph of FIG. 5b, some finite rotor angle is required for the current to rise to its set point level after the phase is switched on. At such speeds, e.g. 9000 RPM, the drive is still regulating current, so some current chopping is apparent. When the phase is subsequently switched off, some finite time is required for the current to fall to zero. In this medium speed range, advancing the initial turn-on position of the current pulse advantageously compensates for the current rise time.

At high speed, e.g. 25,000 RPM, the current requires more time to rise, and never reaches the set current level, so that no current regulation occurs. At such high speeds, the turn-on position is further advanced and the width of the pulse varied, as shown in FIG. 5c, to control motor torque. It is thus apparent that, over wide speed ranges, maximum efficiency in controlling motor torque is achieved through selective adjustment of both pulse position and pulsewidth afforded by the commutator of the present invention.

Figure 6:
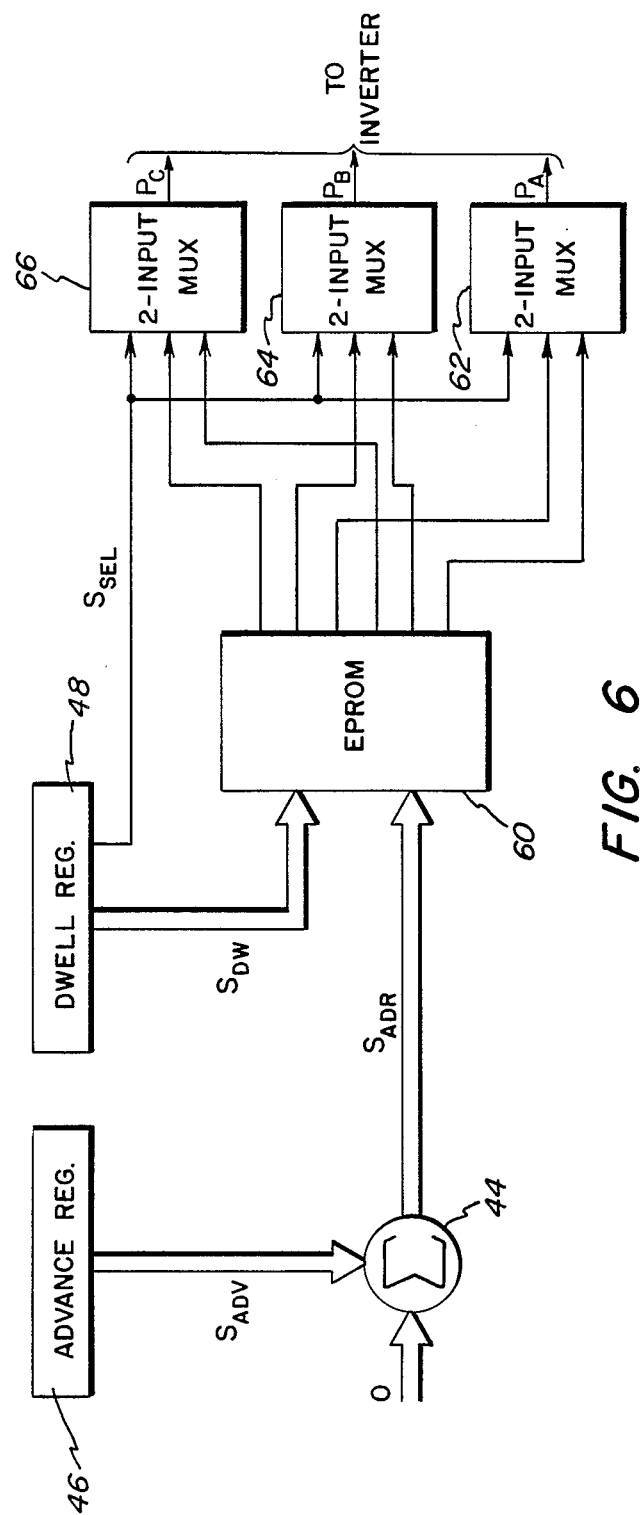
FIG. 6 depicts another embodiment of the commutator of the present invention.

FIG. 6 illustrates an alternate embodiment of the commutator of the present invention. In this 3-stator phase embodiment, an electronically programmable read-only memory (EPROM) 60 is used as the nonvolatile memory. As a practical matter, since most EPROMs currently come in widths of 8 bits, it is possible to store two firing patterns in the same word. The desired pattern is then selected using 2-input multiplexers 62, 64 and 66 as shown, where the select input to the multiplexers is one of the dwell word bits from dwell register 48. Otherwise the commutator of FIG. 6 operates in the same manner as the previously described commutator of FIG. 3.

A prototype system in accordance with the configuration of FIG. 6 has been designed and constructed to drive a 3-phase switched reluctance motor. The system was designed based on a position sensor resolution of 10 bits, or 8 bits at 90° (i.e., 0.35156°/bit). Pulsewidth variation was desired in full resolution steps from zero to 45°. This meant that 45/0.35156 or 128 firing patterns must be stored in the EPROM with each pattern requiring 256 3-bit words of data. Since each EPROM word is 8 bits wide, only 64 sections of the EPROM are needed to store all 128 firing patterns. Using the commutator of the present invention, torque control at speeds as high as 45,000 RPM was achieved with the prototype system.

It will thus be apparent that the commutator of the present invention unloads the commutation function from the microprocessor, allows complete flexibility in pulse positioning and pulsewidth and thereby makes SRM performance possible over a very wide speed range. The present invention allows use of the switched reluctance motor at higher speeds than were previously practical and facilitate use of the SRM as a servo drive in the aerospace industry and other diverse applications.

While preferred embodiments of the present invention have been shown and described herein, it will be obvious to those skilled in the art that such embodiments are provided by way of example only. Accordingly, it is intended that the invention be limited only by the spirit and scope of the appended claims and that the invention encompass all variations, substitutions and equivalents falling therein.

What is claimed is:

1. A digital commutator for a switched reluctance motor having multiple independent stator phases to be sequentially switched on and off in synchronism with rotor position, said commutator controlling timing of said switching with respect to instantaneous rotor position and comprising:

nonvolatile memory means for storing a first sequence of phase switching command pulses for said stator phases over an electrical cycle of the motor, each pulse having a predetermined turn-on angle corresponding to a respective different initial rotor position and having a first predetermined pulsewidth; and addressing means for addressing said memory means in synchronism with instantaneous rotor position such that the memory means produces said first sequence of pulses with the turn-on angle of said pulses shifted in relation to their respective initial rotor positions by an adjustable advance angle.

2. The commutator of claim 1 wherein the memory means includes addressable locations therein for storing said first sequence of phase switching command pulses as words, each word representing the switch state of all phases of the motor at a particular rotor position, and each addressable location representing a different rotor position for the electrical cycle of the motor.

3. The commutator of claim 2 wherein said motor includes N stator phases and said memory means comprises a Read Only Memory having at least N bits for each word to be stored.

4. The commutator of claim 3 wherein each of said N bits represents a switch state of a respective one of said N phases.

5. The commutator of claim 4 wherein said addressing means comprises summing means for summing a first digital signal representative of instantaneous rotor position and a second digital signal representative of said advance angle to provide an address signal representative of the sum of instantaneous rotor position and advance angle, to said memory means.

6. The commutator of claim 5 wherein the Read Only Memory includes multiple memory sections, each of said memory sections storing a respective sequence of phase switching command pulses, each sequence differing from each other only in the predetermined pulsewidth of the pulses, said commutator further comprising dwell means for selecting which one of said memory sections is to be addressed by said addressing means at a particular time in accordance with a desired pulsewidth.

7. The commutator of claim 6 further comprising rotor position sensing means for providing said first digital signal, and an advance register for providing said second digital signal; and wherein said dwell means comprises a dwell register for providing a dwell signal to said memory means.

8. The commutator of claim 7 including a microprocessor for controlling values placed in the advance register and dwell register as a function of motor speed and desired torque, respectively, such that the advance angle of pulses produced by the memory means increases with increasing speed and the pulsewidth varies as a function of commanded torque, said advance register and said dwell register being coupled to output ports of said microprocessor.

9. The commutator of claim 8 wherein said rotor position sensing means comprises a resolver and a resolver-to-digital converter coupled to said resolver.

10. The commutator of claim 5 further comprising multiplexer means for selecting among M different sequences of pulses produced by said memory means, wherein M represents the number of different phase switching command pulses for each stator phase.

11. The commutator of claim 8 wherein the number of addressable locations in each section of the memory means corresponds to a desired rotor angular position resolution for one electrical cycle of the motor and wherein the number of memory sections is determined by the spacing and range of desired pulsewidths.

12. A microprocessor based digital controller for selectively controlling the firing of stator phases in synchronism with rotor angular position of a multiphase switched reluctance drive over a wide speed range, comprising:

microprocessor means for providing an advance angle signal representative of a desired shift in turn-on angle position of a sequence of stator phase firing pulses of common pulsewidth, a dwell angle signal indicative of a desired pulsewidth for said firing pulses, and a set current signal;

commutation means for receiving and processing said advance angle signal, said dwell angle signal and a rotor angular position signal representative of instantaneous rotor angle position, and producing phase firing command pulses for each of said stator phases, said commutation means comprising Read Only Memory means for storing different sequences of said firing pulses, each sequence being stored as at least one digital word at each of a plurality of addressable locations of the memory means, each of said words corresponding to the switch state of all said stator phases for a particular rotor angular position, respectively, and each of said addressable locations corresponding to a different rotor position, respectively, over an electrical cycle of the drive, each of said different sequences corresponding to a difference in pulsewidth of the firing pulses, respectively, said commutator means further comprising summing means for summing said advance angle signal and rotor position signal to provide an address signal for addressing said Read Only Memory in synchronism with instantaneous rotor position, said commutator means further comprising dwell means for selecting which of said firing sequences is to be addressed by said address signal in accordance with the dwell signal received from the microprocessor means; and current regulated inverter means for receiving the set current signal from the microprocessor means and the phase switching command pulses from the commutator means and providing therefrom a stator phase firing pulse train for each stator phase.

13. The controller of claim 12 wherein words stored in the Read Only Memory represent the switch states at respective rotor positions for a multiplicity of said sequences and wherein said commutation means further comprises multiplexer means coupled to said microprocessor means and being responsive to said dwell angle signal for differentiating between said multiplicity of sequences.

14. The controller of claim 12 in combination with: a switched reluctance motor; and rotor position sensing means coupled to said motor for providing said rotor angular position signal.

15. The combination of claim 14 wherein said rotor position sensing means comprises a resolver and a resolver-to-digital converter coupled to said resolver.

16. A digital commutation method for providing firing pulses of adjustable firing angle to an inverter of a multiphase switched reluctance drive to selectively switch current on and off in stator phases of said drive in synchronism with rotor position, comprising the steps of:

storing at least one standard multiphase firing pattern in a nonvolatile memory such that binary representations of a firing state of each stator phase for successive rotor angles over an electrical cycle of the drive are stored at successive addressable locations, respectively, in the memory;

providing a first digital representaion of instantaneous rotor angular position;

providing a second digital representaion of a desired advance angle, said advance angle representing a desired shift in location of said firing pattern with respect to rotor angle;

adding said first and second digital representations to provide a composite address signal; and addresssing said memory with said address signal in synchronism with said digital representation of instantaneous rotor angular position so that the firing pattern shifted by said advance angle can be read out of said memory means.

17. The method of claim 16 further comprising the steps of:

storing standard firing patterns of different pulsewidth in different memory sections, respectively; and providing to the memory a dwell signal indicative of a desired pulsewidth to identify which section of the memory is to be addressed at any given time.

18. In a multiphase switched reluctance drive, a method for controlling the switching of phases with phase firing pulses in a manner to allow variation in timing of the switching with respect to rotor position, comprising the steps of:

storing information defining a first firing pattern of stator phase firing pulses over an electrical cycle of the drive as a function of rotor position in a digital nonvolatile memory, each pulse of said pattern being of identical duration and having a turn-on angle corresponding, respectively, to a different initial rotor position;

receiving a binary position signal representative of instantaneous rotor angular position;

modifying said position signal to provide a modified position signal adjusted to acheive a desired displacement of said pulses relative to their initial rotor positions; and employing the modified position signal to address and read out information from the memory in synchronism with instantaneous rotor angular position, whereby placement of said firing pulses and, accordingly, timing of said switching, can be adjusted as desired.

19. The method of claim 18 wherein said first firing pattern is stored in a first section of said memory, said method further comprising the steps of:

storing, in other sections of said memory, other firing patterns of pulses varying from said first pattern only in pulsewidth; and addressing predetermined ones of said memory sections with said modified position signal depending upon the desired pulsewidth of the firing pulses.

* * * * *